United States Patent [19]
Nakamura

[11] Patent Number: 5,973,843
[45] Date of Patent: Oct. 26, 1999

[54] REFLECTOR METHOD FOR PRODUCING REFLECTOR AND REFLECTION TYPE LIQUID CRYSTAL DISPLAY

[76] Inventor: Hisakazu Nakamura, Park Square 103, 1-46, Kanzan-cho, Yamatokoriyama-shi, Nara-ken, Japan

[21] Appl. No.: 09/205,186

[22] Filed: Dec. 4, 1998

[30] Foreign Application Priority Data

Dec. 22, 1997 [JP] Japan .................................. 9-353898

[51] Int. Cl.$^6$ .................................................. G02B 27/10
[52] U.S. Cl. ........................ 359/619; 359/627; 359/851; 349/113
[58] Field of Search ..................... 359/850, 851, 359/852, 855, 627, 592, 546, 619, 628, 727; 349/113

[56] References Cited

U.S. PATENT DOCUMENTS

| | | | |
|---|---|---|---|
| 4,431,272 | 2/1984 | Yazawa et al. | 349/113 |
| 5,204,765 | 4/1993 | Mitsui et al. | 349/113 |
| 5,408,345 | 4/1995 | Mitsui et al. | 349/42 |
| 5,714,247 | 2/1998 | Kuo et al. | 349/113 |

Primary Examiner—Cassandra Spyrou
Assistant Examiner—E. Cherry

[57] ABSTRACT

A reflector has a plurality of convex/concave portions on a surface of a substrate, Each of the convex/concave portions has a circular or elliptical shape as viewed in a direction perpendicular to the surface of the substrate. The surface of the substrate includes first and second regions adjacent to each other defining a boundary therebetween. In each of the first and second regions, an ellipticity α of the shape of the convex/concave portions continuously changes away from a respective predetermined central position. The ellipticity α is about 1.05+(0.005/3)-β or less, where β=|θ-90|, and θ denotes an angle between long axes of the elliptical shapes of the convex/concave portions on opposite sides of the boundary.

4 Claims, 15 Drawing Sheets

16a or 16b 17a or 17b'

17b or 17a'

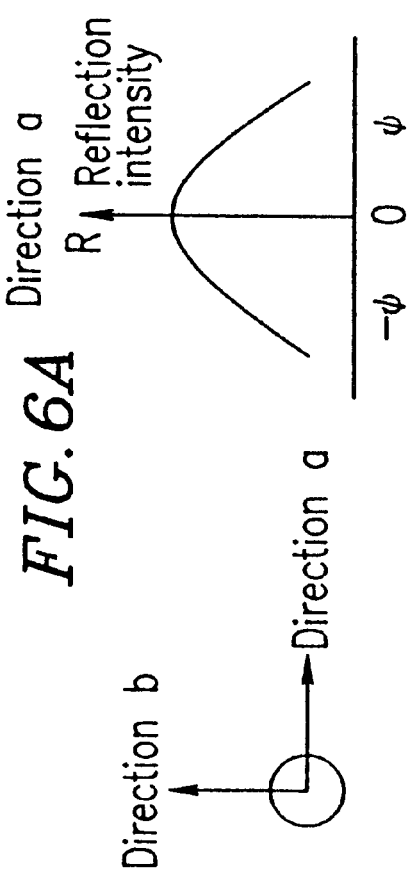
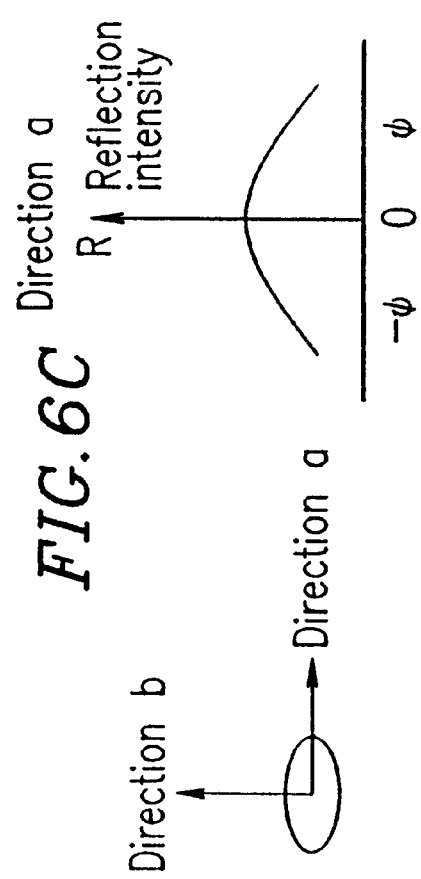
FIG. 6A  FIG. 6B  FIG. 6C  FIG. 6D

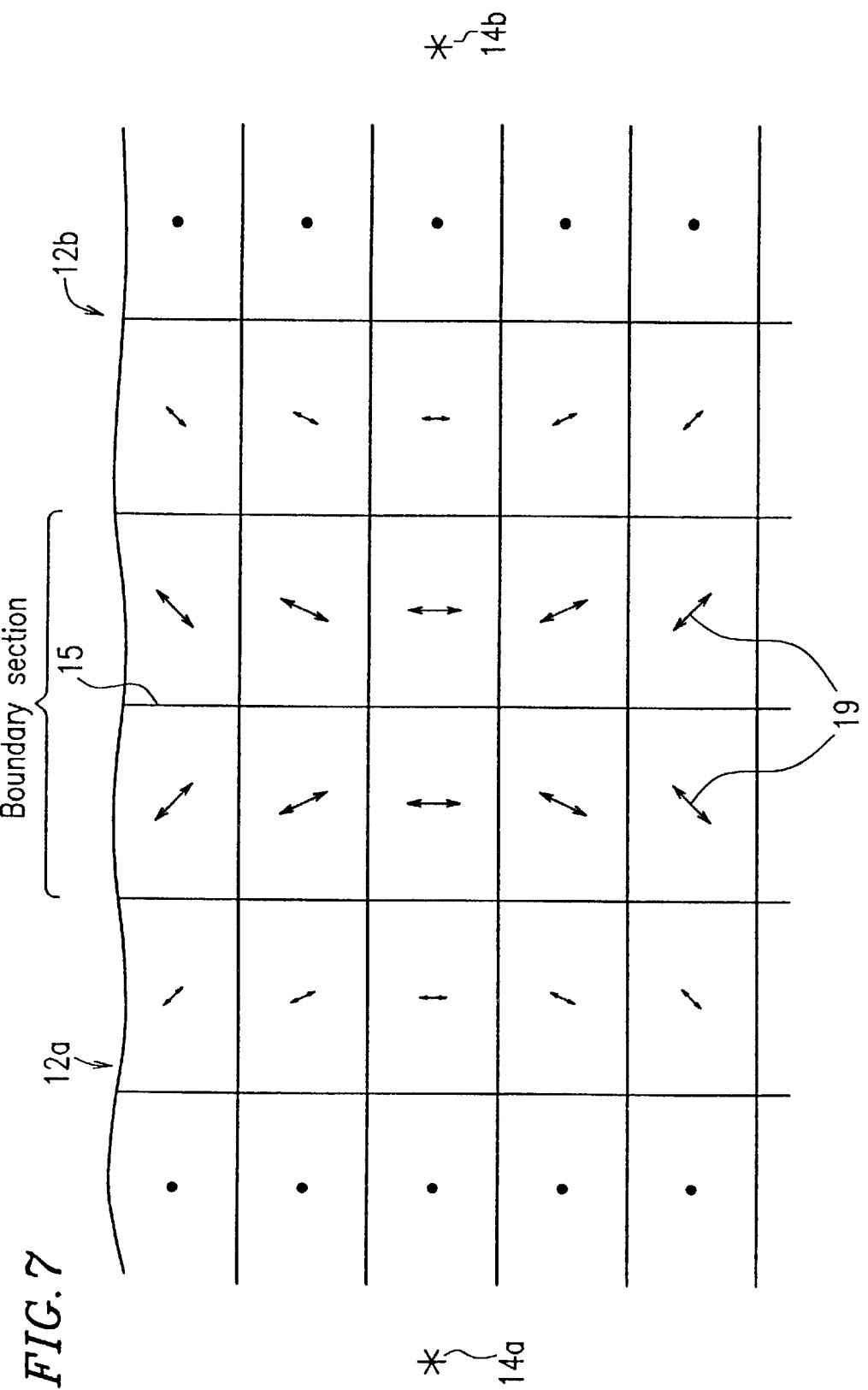

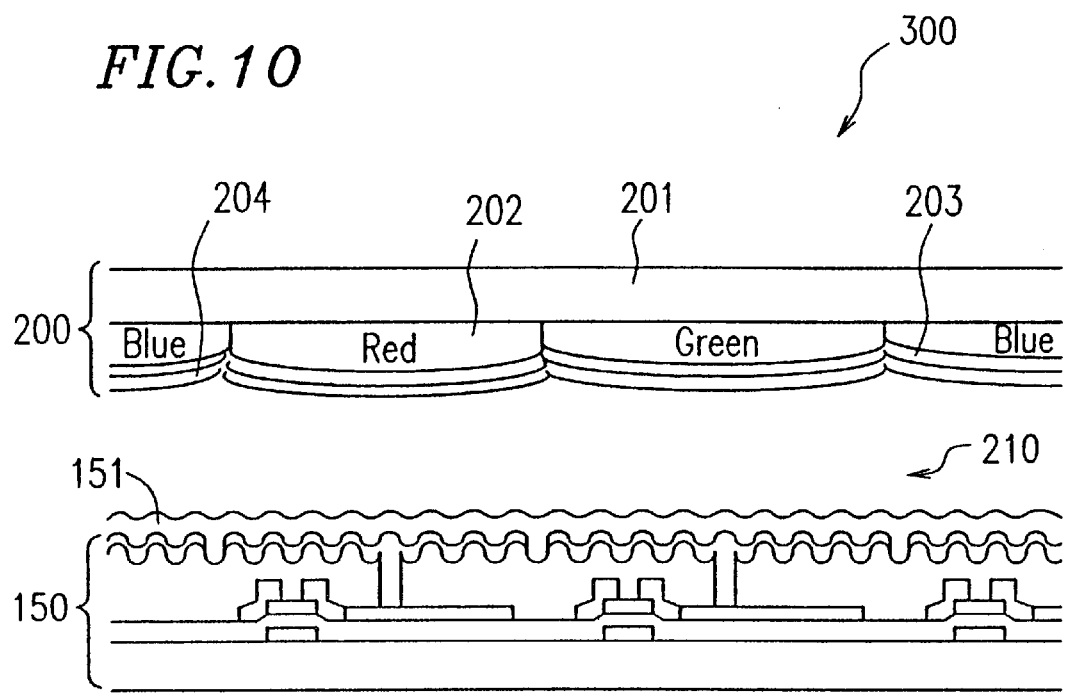

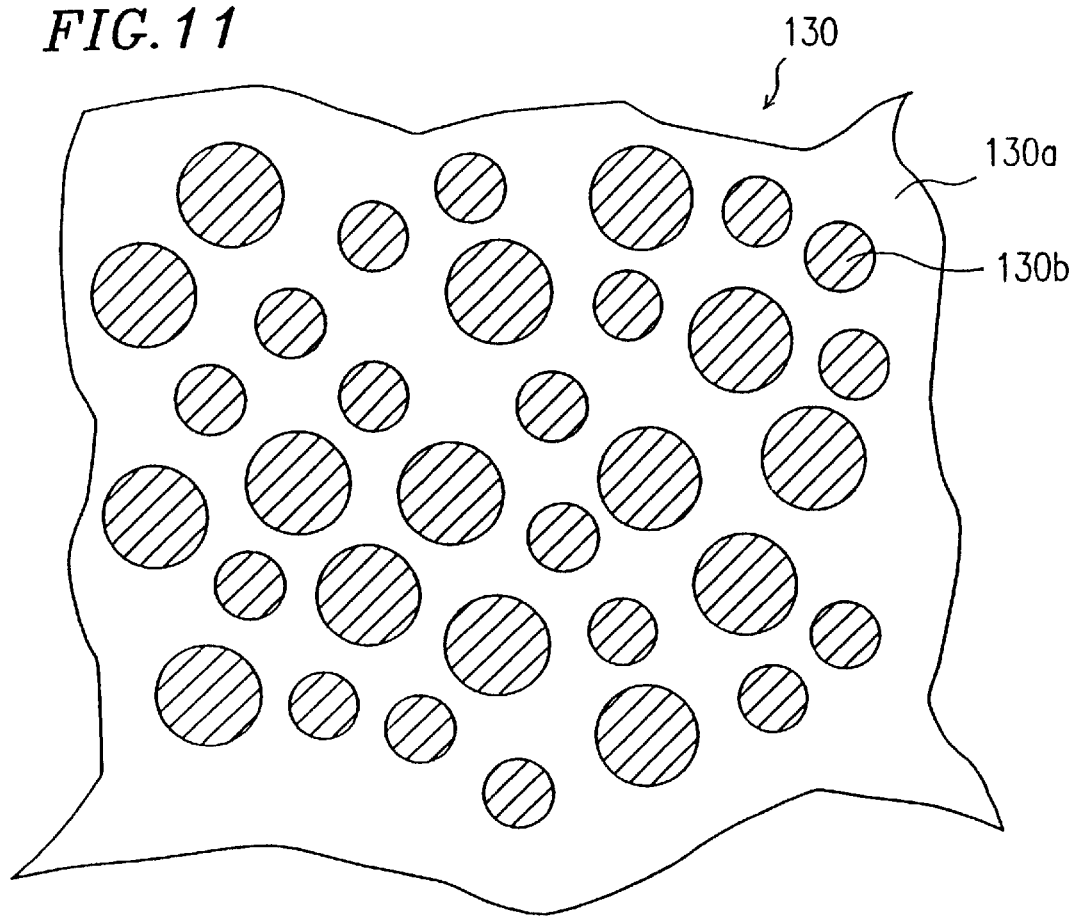

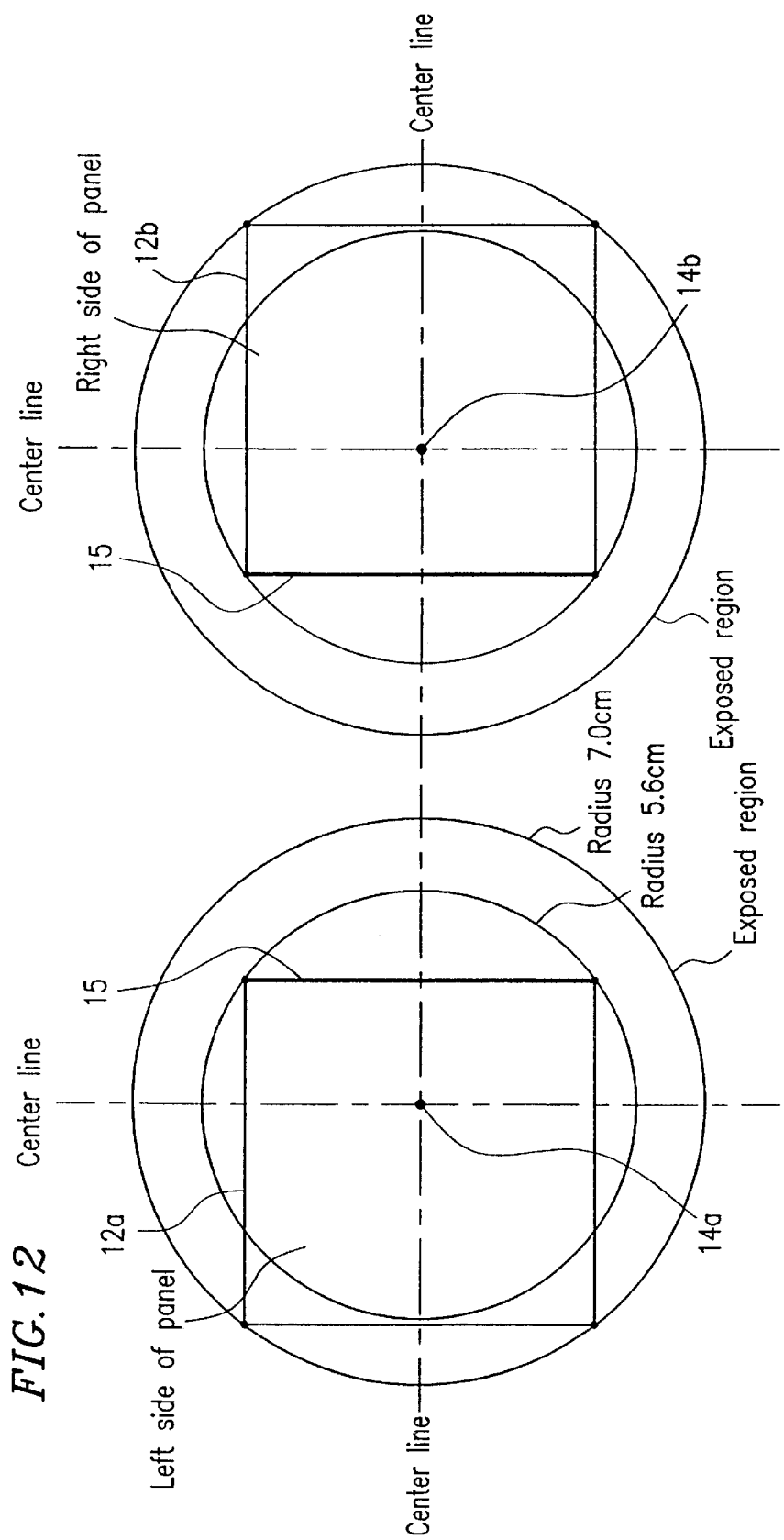

REFLECTOR METHOD FOR PRODUCING REFLECTOR AND REFLECTION TYPE LIQUID CRYSTAL DISPLAY

BACKGROUND OF THE INVENTION

1. Field of the Invention

The present invention relates to a reflector, a method for producing the same, and a reflection type liquid crystal display incorporating the same. More particularly, the present invention relates to a method for producing a reflector in which convex/concave portions are formed on a substrate surface over a plurality of exposure steps, a reflector produced by such a method and a reflection type liquid crystal display incorporating the same.

2. Description of the Related Art

A reflector for use in a reflection type liquid crystal display capable of producing a paper white display includes a large number of convex/concave portions on a surface thereof in order to reflect and scatter light incident thereupon. There are various methods for forming such convex/concave portions, including: forming the convex/concave portions directly on a substrate surface using a sand blast method or an etching method; first forming a thin inorganic oxide film or a metal film on a substrate surface and then partially etching away the thin film; and forming concave portions of an inorganic material on a substrate surface by a plasma CVD method. In order to form the convex/concave portions with high precision and high reproducibility so that the designed reflection characteristic is realized precisely and reproducibly, it is preferable to first form a thin photosensitive organic film on a substrate and then pattern the formed film by a photolithography process. In the exposure step, an exposure machine (projection aligner) is used such as a step and repeat method type exposure (hereinafter referred to as a stepper exposure machine) or a large batch exposure machine.

However, such conventional methods have the following problems. While a large batch exposure machine can expose a large area at once, it has a relatively large variation in irradiation intensity and parallelism of light over a plane to be exposed to the light. A reflector produced by such a large batch exposure machine has a brightness which is not uniform over the screen (e.g., reflection is bright in the vicinity of the exposure center and dark in the peripheral region) and thus has not been in practical use. In view of this, a stepper exposure machine typically has been used in which source light is substantially collimated by a lens system so as to reduce the in-plane variation. However, referring to Figure 1A, the maximum area (indicated by "11") which can be exposed at once by such a stepper exposure machine is only about 6 inches in diameter. Thus, the largest square region 10 on which convex/concave portions can be formed at once has a diagonal line of up to about 6 inches.

In order to expose a larger region such as a rectangle in which a diagonal line connecting opposite corners is about 6 inches or larger with a stepper machine having an exposure area of 6 inches in diameter, for example, a first region 12*a* can be exposed in the first step (the largest area which can be exposed is denoted by reference numeral 13*a*, and the exposure center by 14*a*), and a second region 12*b* can be exposed in the second step (the largest area which can be exposed is denoted by reference numeral 13*b*, and the exposure center by 14*b*), as illustrated in FIG. 1B. However, even when a stepper exposure machine is used, some in-plane light beam variation (or "image distortion", where light beam parallelism is high in the center portion and low in the peripheral region) still exists. Therefore, the obtained reflector causes interference fringes, whereby a "junction (boundary)" 15 between the first and second regions is observed.

In order to reduce the in-plane light beam variation of the stepper exposure machine, the regions 12*a* and 12*b* to be exposed during each exposure step can be reduced. However, this solution increases the number of exposure steps required and thus the number of alignment steps associated therewith, thereby considerably decreasing the production efficiency.

SUMMARY OF THE INVENTION

According to one aspect of this invention, a method for producing a reflector includes the steps of: forming a thin photosensitive film on a surface of a substrate; exposing a first region of the thin photosensitive film using a first mask having a first predetermined pattern; exposing a second region of the thin photosensitive film using a second mask having a second predetermined pattern; and developing the first and second regions of the exposed thin photosensitive film so as to form a pattern of a plurality of convex/concave portions. The steps of exposing the first and second regions are performed in such a manner that variance, from the first and second predetermined patterns, of the pattern of the convex/concave portions obtained through the developing step in a vicinity of a boundary between the first and second regions, is within a predetermined range.

In one embodiment of the invention, the first and second predetermined patterns include a plurality of circles. The convex/concave portion has an elliptical shape in the vicinity of the boundary between the first and second regions. The first and second exposure steps are performed so that an ellipticity $\alpha$, which corresponds to the variance, from the predetermined pattern, of the pattern of the convex/concave portions obtained through the developing step in the vicinity of the boundary between the first and second regions, is about $1.05+(0.005/3)\cdot\beta$ or less (where $\beta=|\theta-90|$, and $\theta$ denotes an angle between long axes of the elliptical shapes of the convex/concave portions on opposite sides of the boundary).

In one embodiment of the invention, the first and second predetermined patterns include a plurality of circles. The convex/concave portion has an elliptical shape in the vicinity of the boundary between the first and second regions. The variance, from the first and second predetermined pattern, of the pattern of the convex/concave portions obtained through the developing step in the vicinity of the boundary between the first and second regions, is about 1.05 or less in terms of ellipticity.

In one embodiment of the invention, at least one of respective exposure centers of the first and second exposure steps is offset from centers of gravity of the first and second regions, respectively.

In one embodiment of the invention, the first mask and the second mask are the same mask.

In one embodiment of the invention, the first predetermined pattern and the second predetermined pattern are the same pattern.

According to another aspect of this invention, a reflector includes a plurality of convex/concave portions on a surface of a substrate. Each of the convex/concave portions has a circular or elliptical shape as viewed in a direction perpendicular to the surface of the substrate. The surface of the substrate includes first and second regions adjacent to each other defining a boundary therebetween. In each of the first and second regions, an ellipticity α of the shape of the convex/concave portions continuously changes away from a respective predetermined central position. The ellipticity α is about 1.05+(0.005/3)·β or less (where β=|θ−90|, and θ denotes an angle between long axes of the elliptical shapes of the convex/concave portions on opposite sides of the boundary).

In one embodiment of the invention, the ellipticity is about 1.05 or less.

In one embodiment of the invention, at least one of respective predetermined central positions of the first and second regions is offset from centers of gravity of the first and second regions, respectively.

According to still another aspect of this invention, a reflection type liquid crystal display has a reflector which includes a plurality of convex/concave portions on a surface of a substrate. Each of the convex/concave portions has a circular or elliptical shape as viewed in a direction perpendicular to the surface of the substrate. The surf ace of the substrate includes first and second regions adjacent to each other defining a boundary therebetween. In each of the first and second regions, an ellipticity α of the shape of the convex/concave portions continuously changes away from a respective predetermined central position. The ellipticity α is about 1.05+(0.005/3)·β or less (where β=|θ−90|, and θ denotes an angle between long axes of the elliptical shapes of the convex/concave portions on opposite sides of the boundary).

According to still another aspect of this invention, a method for producing a reflector includes the steps of: forming a thin photosensitive film on a surface of a substrate; exposing a first region of the thin photosensitive film using a mask having a predetermined pattern; exposing a second region of the thin photosensitive film using the mask having the predetermined pattern; and developing the first and second regions of the exposed thin photosensitive film so as to form a pattern of a plurality of convex/concave portions. The steps of exposing the first and second regions are performed in such a manner that variance, from the predetermined pattern, of the pattern of the convex/concave portions obtained through the developing step in a vicinity of a boundary between the first and second regions, is within a predetermined range.

Functions of the present invention will now be described.

The method for producing a reflector of the present invention involves two or more exposure steps each for forming a plurality of convex/concave portions on a substrate. The exposure is performed after having taken into account an exposure pattern distortion produced at the junction during the two exposure steps (i.e., the boundary between the first region exposed in the first exposure step and the second region exposed in the second exposure step) so that variance of a resultant pattern of the convex/concave portions from the predetermined pattern is within a predetermined range. Therefore, the "junction" produced due to the discontinuity of the convex/concave portions at the boundary is not observed.

In a typical case where each convex/concave portion has a circular shape as viewed in a direction perpendicular to a surface of the substrate (i.e., when a mask of a circular pattern is used), the exposure pattern is distorted in a peripheral region of the mask into a pattern which can be approximated to an elliptical shape. An elliptical convex/concave portion has a reflection characteristic different from that of a circular convex/concave portion and has an anisotropy. Therefore, the mask pattern junction is observed.

According to the present invention, an ellipticity (α) at the junction and an angle (θ°) formed between a long axis of the convex/concave portion on one side of the junction and a long axis of the convex/concave portion on the other side of the junction are set to meet a predetermined condition such that the reflection characteristic on one side of the junction does not differ significantly discontinuously from that on the other side of the junction. More specifically, the junction is not observed when the ellipticity α is set to be about 1.05+(0.005/3)·β or less (where β=|θ−90|). Qualitatively, this condition indicates that the ellipticity α is to be closer to 1 as the angle θ between the long axes of the ellipses on the opposite sides of the junction is greater. When the ellipticity α is about 1.05 or less, the junction is not observed regardless of the angle θ.

Since the distortion of the exposed pattern occurs substantially radially from the center of exposure, the long axis of the ellipse extends in a radial direction from the exposure center. In view of this, the angle θ can be controlled within a predetermined range by appropriately controlling the positional relationship between the exposure center in the first exposure step and that of the second exposure step.

Thus, the invention described herein makes possible the advantages of: (1) providing a method for producing a reflector in which a plurality of exposure steps are performed, and the display quality is not reduced by the exposure junction; (2) providing a reflector produced by such a method; and (3) providing a reflection type liquid crystal display incorporating the same.

These and other advantages of the present invention will become apparent to those skilled in the art upon reading and understanding the following detailed description with reference to the accompanying figures.

BRIEF DESCRIPTION OF THE DRAWINGS

FIGS. 6A and 6B are schematic diagrams illustrating the relationship between the shape of a convex/concave portion and the anisotropy of the reflection intensity, in the case where the convex/concave portion has a circular shape;

FIGS. 6C and 6D are schematic diagrams illustrating the relationship between the shape of a convex/concave portion and the anisotropy of the reflection intensity, in the case where the convex/concave portion has an elliptical shape;

FIG. 7 is a schematic diagram illustrating the anisotropy of the reflection characteristic of a reflector produced through two exposure steps in the vicinity of the exposure junction;

FIG. 10 is a cross-sectional view illustrating a reflection type liquid crystal display of the present invention;

FIG. 11 is a top view illustrating an exemplary mask which can be used for producing the reflector of the present invention;

FIG. 12 is a schematic diagram illustrating exposure steps performed in a method for producing a reflector of the present invention;

DESCRIPTION OF THE PREFERRED EMBODIMENTS

An embodiment of the present invention will now be described.

Figure 1A:
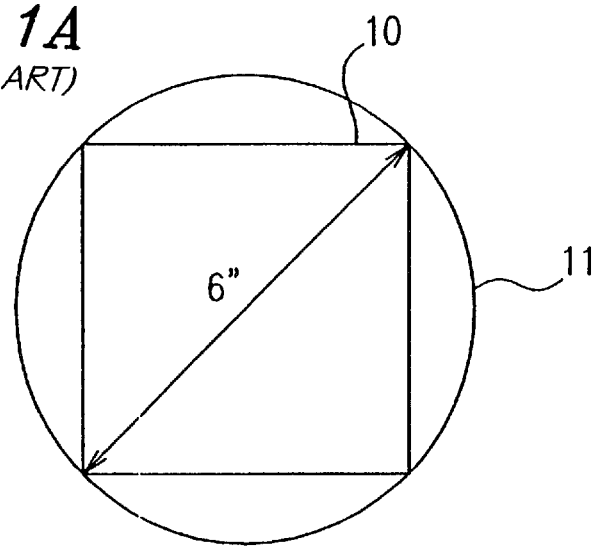
FIG. 1A is a schematic diagram illustrating a maximum area which can be exposed in one exposure step using a stepper exposure machine.
Figure 1B:
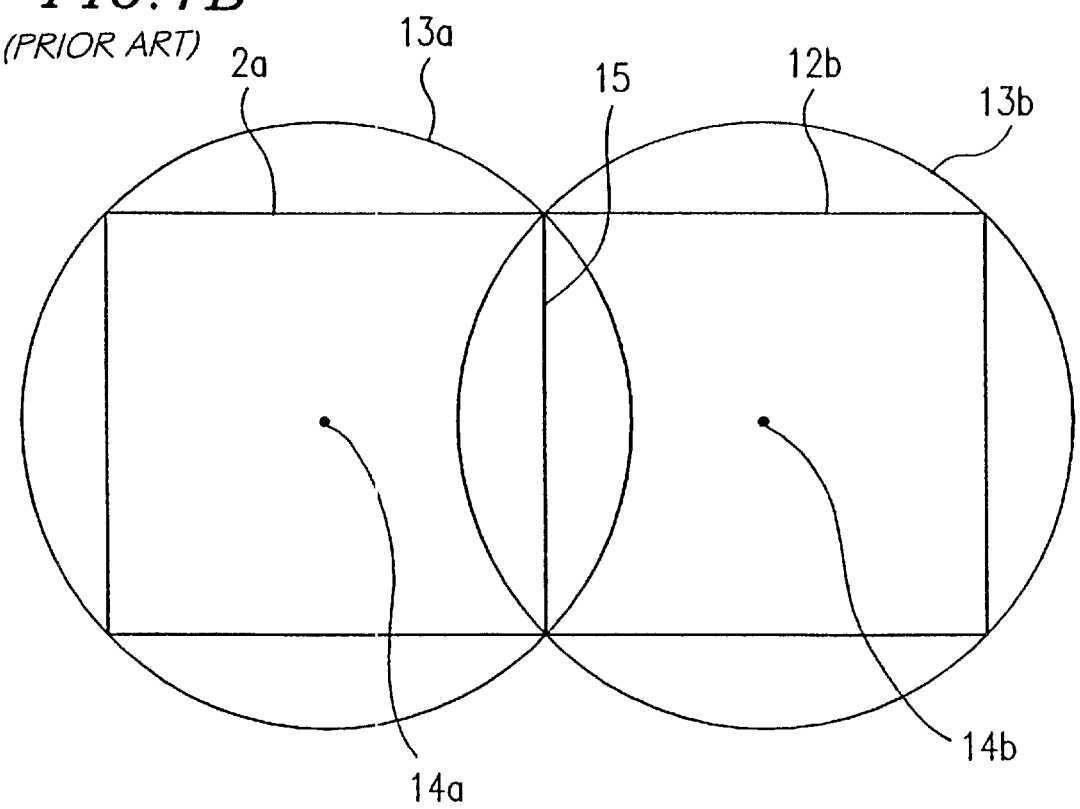
FIG. 1B is a schematic diagram illustrating a maximum area which can be exposed in two exposure steps using a stepper exposure machine.
Figure 2A:
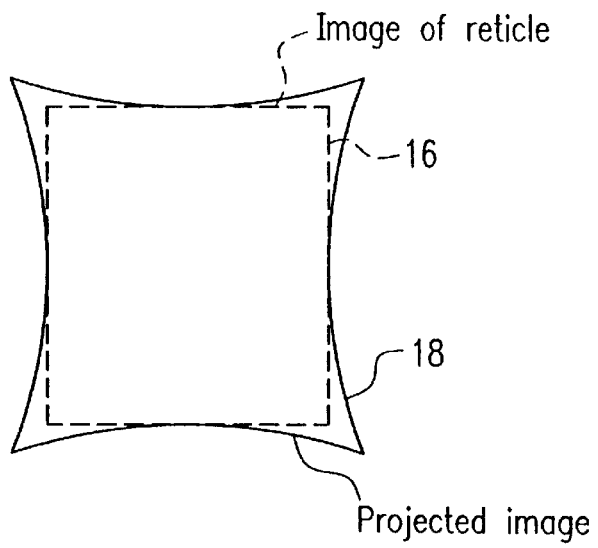
FIG. 2A is a schematic diagram illustrating a light beam distortion of a stepper exposure machine.
Figure 2B:
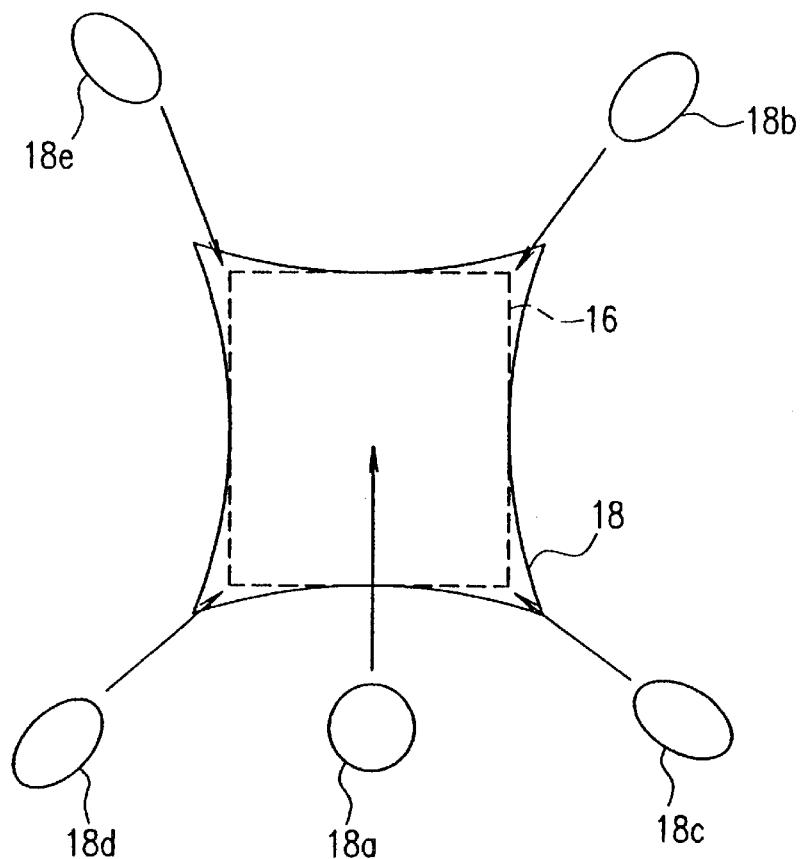
FIG. 2B is a schematic diagram illustrating a change in a mask pattern shape when a mask having a pattern including circles is used.

First, referring to FIGS. 2A and 2B, the light beam distortion of the stepper exposure machine will be described. Since the light beams of the stepper exposure machine are not completely collimated, an actual image 18 projected by the stepper exposure machine through a mask is distorted from an ideal image 16 which would be obtained by irradiating the same mask with completely collimated light. The degree of distortion is greater in the peripheral region. When using a mask patterned for irradiating a plurality of circular regions with light, a substantially circular pattern 18a is exposed in the vicinity of the exposure center, but the predetermined circular pattern is not obtained in the peripheral region, where an elliptical shape such as those indicated by reference numerals 18b to 18e results.

The distortion of a lens of an exposure machine (including a magnifying power error) is called a "lens distortion", which can be determined by performing exposure using a mask (reticle) having a pattern including a plurality of ideal lattice points (e.g., corners of squares or rectangles of different sizes) and then measuring the variance between the exposed pattern and the ideal lattice points. Exposure machines of different lens distortion were used to produce various reflectors. For each of the produced reflectors, the ellipticity and whether the junction is observed were determined. The results are as follow.

A plurality of convex/concave portions as illustrated in FIGS. 3A to 3D were formed by first providing a thin photosensitive film on a substrate surface, exposing the thin photosensitive film twice through two exposure steps and developing the exposed pattern. The first region 12a was exposed in the first exposure step and the second region 12b was exposed in the second exposure step. A circular shape was employed as the predetermined shape, with the respective centers of gravity of the regions 12a and 12b being the exposure centers thereof. The centers of gravity of the regions 12a and 12b as used herein refer to centers of gravity when each of the regions assumedly has a uniform thickness and a uniform density across the region. A second mask which is used in the second exposure step may be the same as or different from a first mask which is used in the first exposure step. In the event the masks used in the first and second exposure steps are different, the masks may have the same predetermined pattern or different predetermined patterns.

Figure 3A:
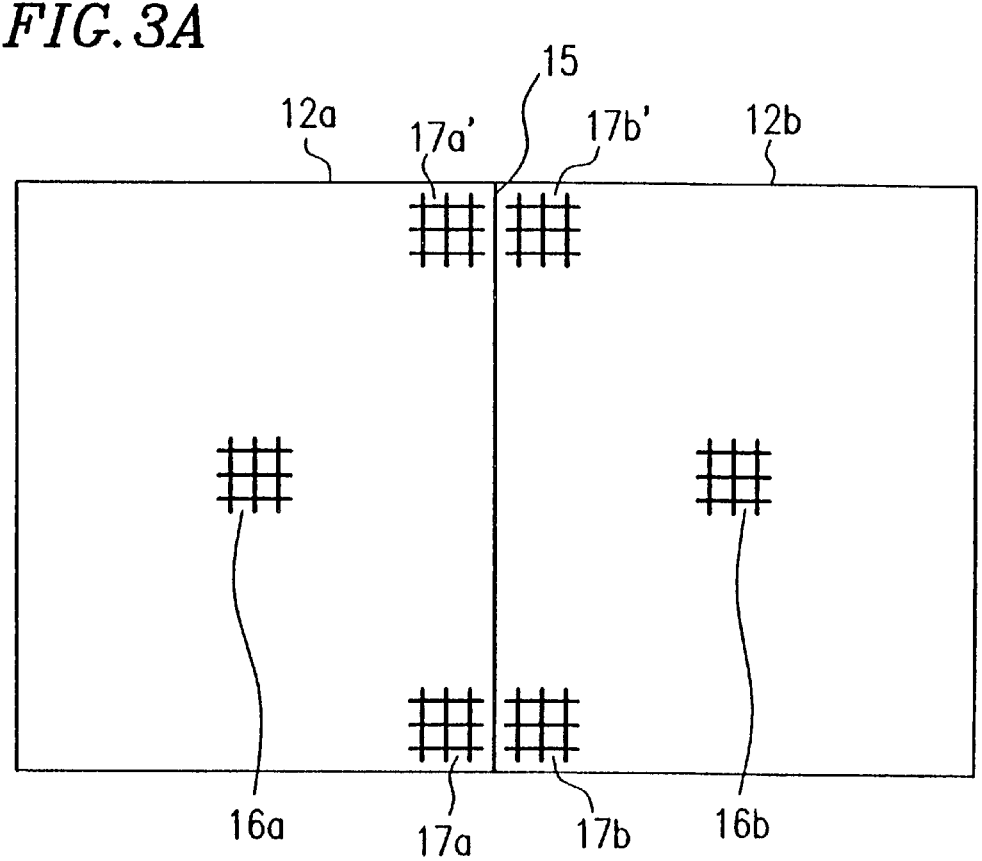
FIG. 3A to 3D are schematic diagrams illustrating a change in shape of convex/concave portions when a reflector is produced through two exposure steps.
Figure 3B:
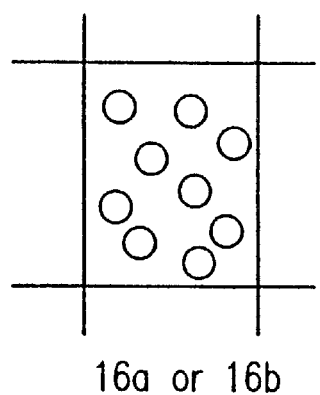
Figure 3C:
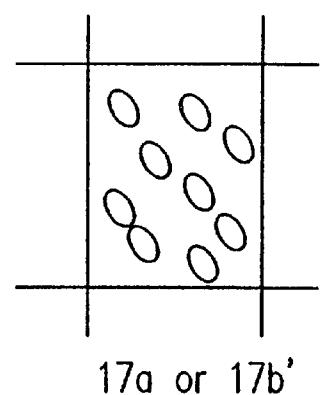
Figure 3D:
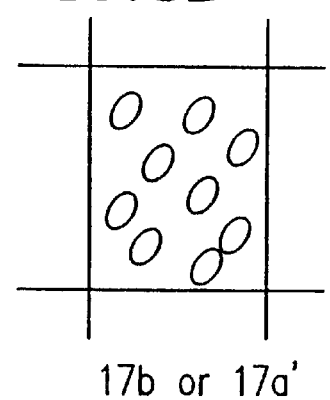

The obtained convex/concave portions in regions 16a and 16b in the vicinity of the respective exposure centers were substantially circular, as illustrated in FIG. 3B. However, in peripheral regions 17a and 17b, the obtained convex/concave portions were elliptical, as illustrated in FIGS. 3C and 3D. The long axes of the ellipses were aligned radially about the exposure center, and an ellipse closer to the periphery of the region had a longer long axis. Therefore, the shape of the convex/concave portion in the vicinity of the boundary 15 between the adjacent first and second regions 12a and 12b was greatly distorted from a circular shape. The long axes of the convex/concave ellipses in corner regions 17a, 17a', 17b and 17b' (where the distortion was greatest) had a mirror image relationship with respect to the boundary 15 and changed significantly discontinuously between the opposite sides of the boundary 15.

Figure 4A:
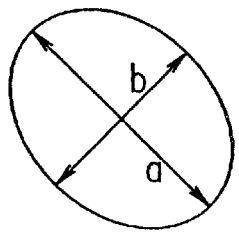
FIGS. 4A to 4D are schematic diagrams illustrating how a long axis and a short axis of various shapes can be defined for quantatively evaluating the rate of change of a mask pattern.

In order to quantatively evaluate the degree of distortion (referred to also as the "rate of change") of the convex/concave portions due to the lens distortion, the ellipticities a of the convex/concave portions were measured. Referring to FIG. 4A, the term "ellipticity (β)" of an ellipse as used herein refers to a ratio "a/b" between the length "a" of the long axis and the length "b" of the short axis of the ellipse.

Figure 5:
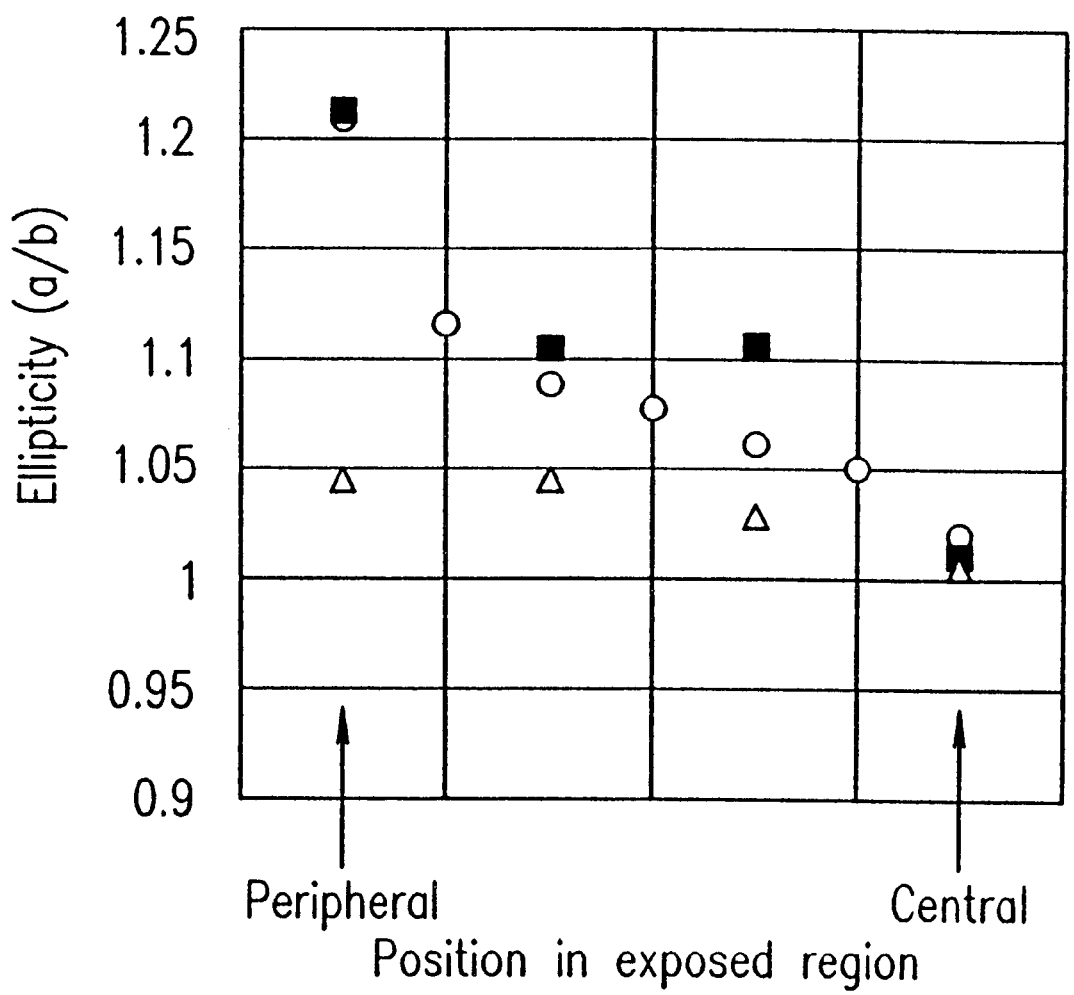
FIG. 5 is a graph illustrating a position dependency of the ellipticity within the exposed region.

FIG. 5 shows ellipticities measured at different points within the exposed region (along a diagonal line of the exposed region between the center and a corner thereof) for each of three different reflectors (represented by "○", "■" and "Δ", respectively). The reflectors "○", "■" and "Δ" had lens distortions of about ±0.5 $\mu$m or less, about ±0.5 $\mu$m or less and about ±0.25 $\mu$m or less, respectively.

As can be seen from FIG. 5, when the lens distortion is about ±0.5 $\mu$m or less (the reflectors ○ and ■), the circular shape is distorted in the peripheral region, as illustrated in FIG. 3C or 3D, whereby the ellipticity a exceeds about 1.2 in the peripheral region (in the vicinity of the boundary). In each of these reflectors, the boundary 15 between the first exposed region 12a and the second exposed region 12b was observed as a junction. In contrast, when the lens distortion is as small as about ±0.25 $\mu$m or less (the reflector Δ), the ellipticity α in the peripheral region is about 1.05 or less, and the junction was not observed. Although not shown, when the ellipticity and whether the junction is observed were measured at an increased number of measurement points, it was shown that the junction is not observed when the ellipticity (rate of change) was about 1.05 or less on both sides of the boundary 15.

Referring to FIGS. 6A, 6B, 6C, 6D and 7, the relationship between the ellipticity and the phenomenon that the junction is observed will be described. When the convex/concave portion has a circular shape, as illustrated in FIGS. 6A and 6B, the reflection intensity changes for various viewing angles ψ along an azimuth direction (direction a) in substantially the same manner as that for viewing angles ψ along another azimuth direction (direction b) perpendicular to the direction a. Thus, when the convex/concave portion has a circular shape, the viewing angle dependency of the reflection intensity is the same (isotropic) in any azimuth directions.

When the convex/concave portion has an elliptical shape, as illustrated in FIGS. 6C and 6D, the change in the reflection intensity for the various viewing angles ψ along the azimuth direction a is considerably different from that for the viewing angles ψ along the perpendicular azimuth direction b. Thus, when the convex/concave portion has an elliptical shape, the viewing angle dependency of the reflection intensity varies anisotropically. In particular, the reflection intensity is relatively low in the direction a (along the long axis of the ellipse), and the reflection intensity is relatively high in the direction b (along the short axis of the ellipse). In other words, the reflection intensity is higher along a tangential direction of a circle about the exposure center and lower along a radial direction of the circle.

FIG. 7 schematically illustrates the position dependency of the reflection intensity anisotropy in the vicinity of the boundary 15. The direction of an arrow 19 represents a direction (along the short axis of the ellipse) in which an observed image is relatively bright (hereinafter referred to as a "high brightness direction"), and the length of the arrow 19 represents the degree of anisotropy (the magnitude of the ellipticity α). In the vicinity of the exposure centers 14a and 14b, the reflection intensity has substantially no anisotropy (a dot in FIG. 7 indicates that there is substantially no anisotropy in the region). It can be seen from FIG. 7 that the anisotropy is higher in a region farther away from the exposure center. The anisotropy continuously increases toward a peripheral region away from the exposure center. The anisotropy is large in the vicinity of the boundary between the exposed regions 12a and 12b, and the high brightness direction changes discontinuously, whereby the junction 15 is observed.

As described above, whether the junction is observed or not depends upon the magnitude of the anisotropy and the degree of change in the high brightness direction. Therefore, these factors should be set within a predetermined range. As will be discussed in the following description of an example of the present invention, the degree of change in the high brightness direction can be represented by the angle (θ°) formed between a long axis of the convex/concave portion on one side of the junction (which is produced during the two exposure steps) and a long axis of the convex/concave portion on the other side of the junction. It has been shown that the junction is not observed when the ellipticity α is set to be about 1.05+ (0.005/3)·β or less (where β=|θ−90|). When the ellipticity a is about 1.05 or less, the junction is not observed regardless of the angle θ.

Figure 4B:
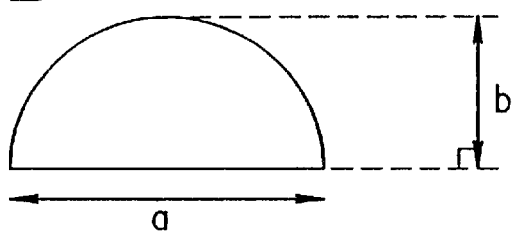
Figure 4C:
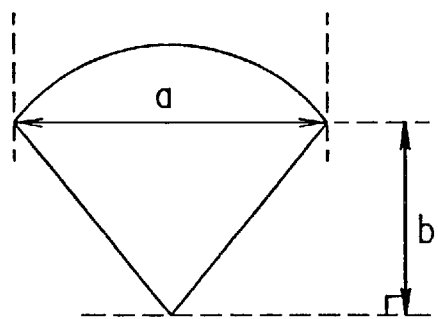
Figure 4D:
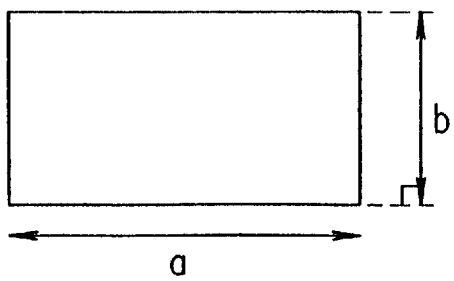

While a case where the predetermined shape of a convex/concave portion is circular has been described above, the same can be applied to other shapes. For example, similar results have been obtained for rates of change of convex/concave portions having a semi-circular shape, a fan shape, or a rectangular shape, as illustrated in FIGS. 4B to 4D, respectively (the long and short axes were defined as "a" and "b", respectively, as shown in FIG. 4B to 4D). For a regular polygon having six corners or more (e.g., a regular heptagon, a regular octagon, etc.), the rate of change can similarly be obtained while approximating the shape to a circle. Other polygons can be defined by a combination of a triangle, a fan shape, etc.

EXAMPLE

An example of the present invention will now be described.

Figure 8A:
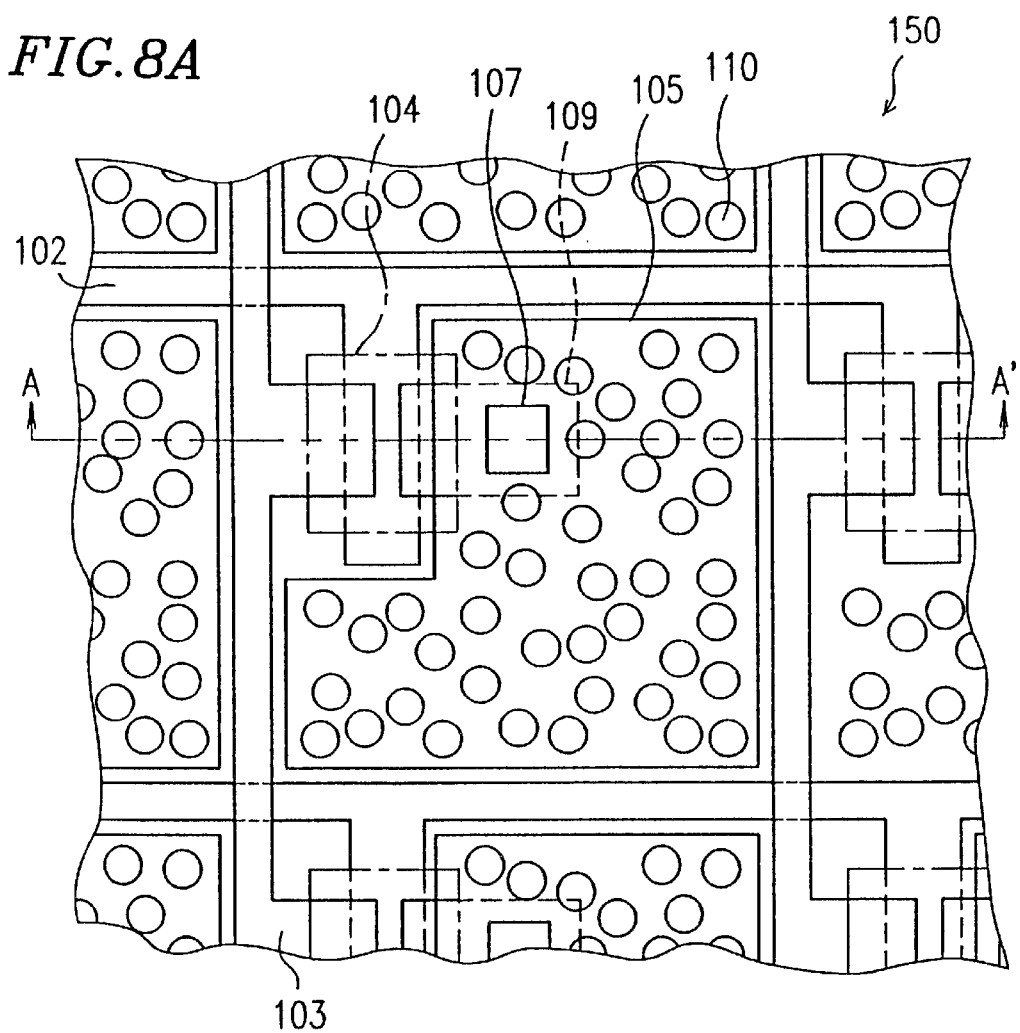
FIG. 8A is a top view of a reflector of the present invention.
Figure 8B:
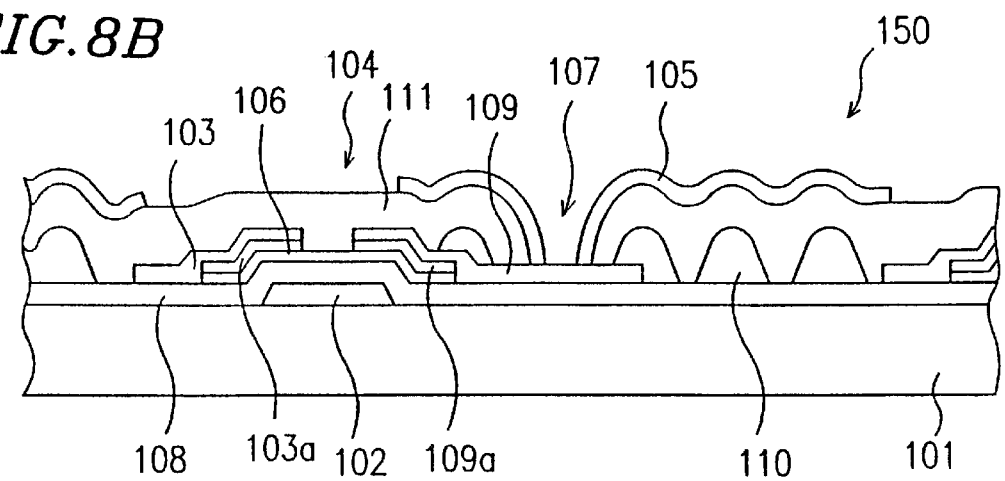
FIG. 8B is a cross-sectional view taken along line A–A' in FIG. 8A.

FIGS. 8A and 8B illustrate a portion of a reflector 150 according to the present invention. FIG. 8A is a top view of the reflector 150, and FIG. 8B is a cross-sectional view thereof taken along line A–A' in FIG. 8A. The reflector 150 includes a gate bus line 102, a source bus line 103 and a TFT element 104 formed on a glass substrate 101. The reflector 150 further includes convex/concave pixel electrodes each connected to a drain electrode 109 of the TFT element 104 via a contact hole 107. The TFT element 104 includes the gate line 102, a gate insulation film 108 which covers the gate line 102, a semiconductor layer 106 formed on the gate insulation film 108, and source and drain contact regions 103a and 109a for connecting source and drain regions (not shown) of the. semiconductor layer 106 to the source bus line 103 and the drain electrode 109, respectively.

The convex/concave pixel electrode is a reflective electrode and includes convex/concave portions 110 made of a resist layer, a flattening layer 111 and a thin metal film 105 covering the flattening layer 111. Each convex/concave portion 110 has a substantially circular shape as viewed in a direction perpendicular to the substrate 101. The display area of the liquid crystal panel has a diagonal line of about 8 inches. Since the entire structure cannot be exposed at once by a stepper exposure machine having a 6 inch diameter, two exposure steps were performed at different positions.

Referring to FIGS. 9A to 9G, steps for producing the convex/concave pixel electrode section of the reflector 150 will be described.

Figure 9A:
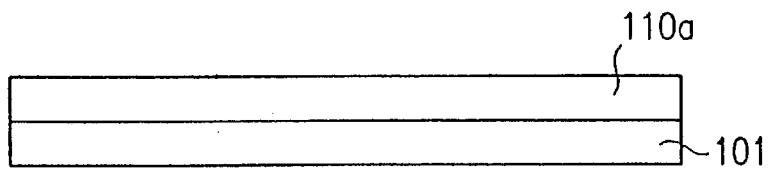
FIGS. 9A to 9G are cross-sectional views illustrating respective steps for producing a convex/concave pixel electrode section of the reflector illustrated in FIG.s 8A and 8B.

First, referring to FIG. 9A, a resist material (e.g., "OFPR-800": produced by TOKYO OHKA KOGYO CO., LTD.) is spin-coated on one surface of a glass substrate about 1.1 mm thick ("7059": produced by CORNING INC.) preferably at about 500 rpm to about 3000 rpm, thereby providing a resist layer 110a. In this example, the spin coating is performed at about 2000 rpm for about 30 seconds, thereby providing the resist layer 110a having a thickness of about 1.0 μm. Then, a pre-bake is performed for about 30 seconds using a hot plate.

Figure 9B:
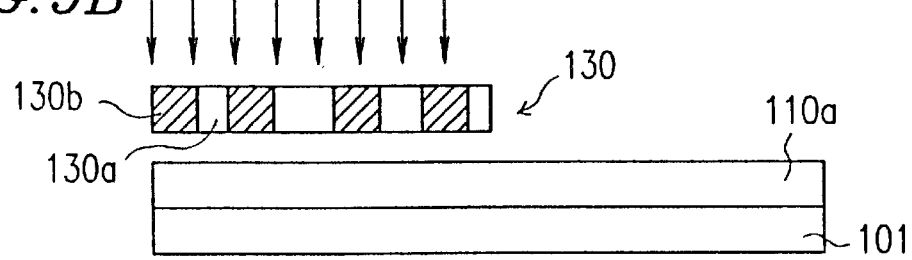
Figure 9C:
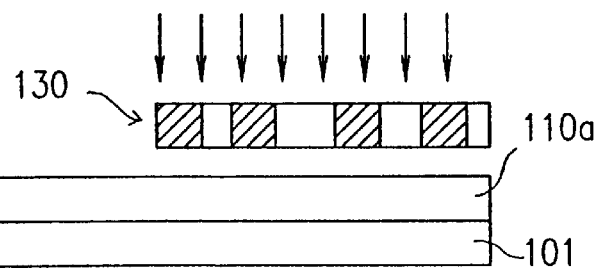
Figure 9D:
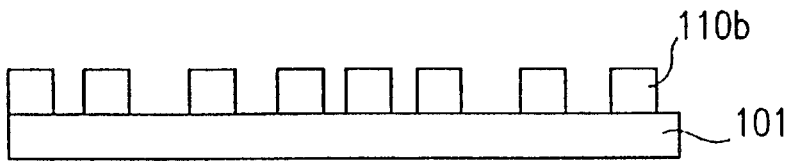

Thereafter, a photomask 130 including a plurality of randomly-positioned circular light-blocking portions 130b, which also serve to define light-transmitting portions 130a, is aligned above the glass substrate 101 such that surfaces of the photomask 130 and the glass substrate 101 are parallel to one another, as illustrated in FIG. 9B, and a first exposure step is performed to produce a first exposed region. Then, the photomask 130 is aligned to be continuous with the first exposed region, as illustrated in FIG. 9C, and a second exposure step is performed to produce a second exposed region. It will be appreciated that while the present example depicts the same photomask 130 to be used to produce both the first and second exposed regions, two separate photomasks could have been used. For exposure, a stepper exposure machine having a lens distortion of about ±0.25 μm is used.

Thereafter, the resist layer 110a is developed to provide a plurality of convex/concave portions 110b each having a circular shape, as illustrated in FIG. 8A. In the present example, about 2.38% of NMD-3, produced by TOKYO OHKA KOGYO CO., LTD., is used as a developing solution.

Figure 9E:
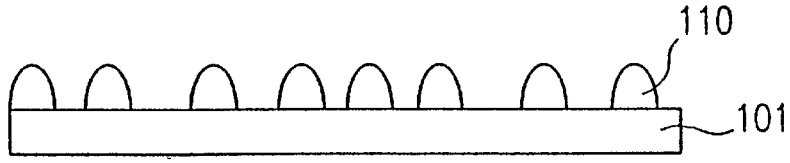

Moreover, a heat treatment at about 120° C. to about 250° C. is performed so that the convex/concave portions 110b are rounded off and to obtain the convex/concave portions 110 having a smooth surface, as illustrated in FIG. 9E. In the present example, a heat treatment at about 250° C. is performed for about 30 minutes.

Figure 9F:
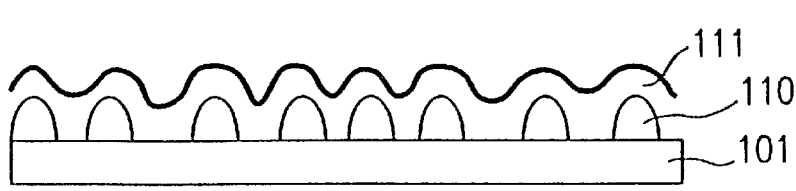

More preferably, in order to provide an even smoother convex/concave surface, the flattening layer 111 may be provided on the structure produced as described above. A resist material (e.g., "OFPR-800": produced by TOKYO OHKA KOGYO CO., LTD.) is spin-coated on the flattening layer 111 preferably at about 500 rpm to about 3000 rpm. In the present example, the spin coating is performed at about 2500 rpm for about 30 seconds, thereby providing a resist layer having a thickness of about 0.7 $\mu$m. Then, a heat treatment at about 250° C. for about 30 minutes is performed, as in the convex/concave portion formation step, for the heat deformation and thermosetting (FIG. 9F).

Figure 9G:
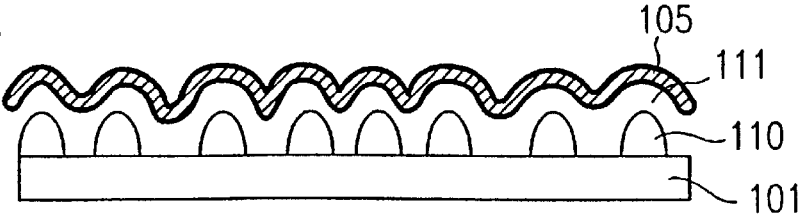

After these steps, the thin metal film 105 is provided on the surface of the structure. Al, Ni, Cr, Ag, or the like, may be used as a material of the thin metal film 105. The thickness of the thin metal film 105 is suitably about 0.01 $\mu$m to about 1.0 $\mu$m. In the present example, the thin metal film 105 is provided by vacuum evaporation of Al. Thus, the reflector 150, as illustrated in FIG. 9G, is obtained.

Referring now to FIG. 10, an alignment film 151 is applied on the reflector 150 and a rubbing treatment is performed. Then, the resulting structure is attached to a counter substrate 200 via a spacer of about 4.5 82 m. A guest-host type liquid crystal material mixed with a black dye is used as a liquid crystal layer 210. Thus, a reflection type liquid crystal display 300 is provided. The counter substrate 200 includes a glass substrate 201 and R, G and B color filter portions 202 provided on the glass substrate 201 each corresponding to a picture element. A counter electrode 203 made of ITO (Indium Tin Oxide) and an alignment film 204 are formed in this order covering the color filter portions 202.

The reflector 150 may be produced by any method known in the art except that the exposure conditions for the first and second exposure steps are set so that the junction is not observed.

The produced reflection type liquid crystal display 300 was tested for the display performance and provided a uniform display with substantially no reflection characteristic variation over the entire panel, and the junction between the first and second exposed regions was not observed.

The exposure step performed during production of the reflector 150 and the reflection characteristic thereof will be described in greater detail. FIG. 11 illustrates an exemplary mask 130 used in the exposure step. The mask 130 includes a light-transmitting portion 130a and a light-blocking portions 130b. The lightblocking portions 130b include circles of two different sizes. Convex/concave portions are formed in accordance with the pattern of the light-blocking portions 130b. Either convex or concave portions can be formed depending upon whether a positive type or negative type material is used for the resist layer 110a. Although the pattern including circles of two different sizes is used in the illustrated example, other patterns may alternatively be employed, such as a pattern including circles of one size, or a pattern including one or more other shapes.

In order to desirably reflect and scatter incident light so as to provide a white display, the diameter of each convex/concave portion is preferably in a range between about 3 $\mu$m and about 20 $\mu$m. When the diameter is less than about 3 $\mu$m, which is close to the patterning precision limit, adjacent convex/concave portions may adhere to each other to form a flat portion. When such a flat portion is formed, a portion of reflected light interferes with another portion thereof, thereby providing a stripe pattern. Also when the diameter is greater than about 20 $\mu$m, a flat portion, and thus a stripe pattern, is likely to be caused. In the present example, the diameter of each light-blocking portion 130b was set from about 5 $\mu$m to about 8 $\mu$m.

In the present example, in order to reduce the rate of change (ellipticity) at the junction 15, the exposure center 14a (14b) of the first (second) exposure step was offset from the center of gravity of the first exposed region 12a (second exposed region 12b) toward the junction 15, as illustrated in FIG. 12. More specifically, the exposure steps were each performed so that the junction 15 was at about 5.6 cm or less from the exposure center 14a (14b).

Figure 13:
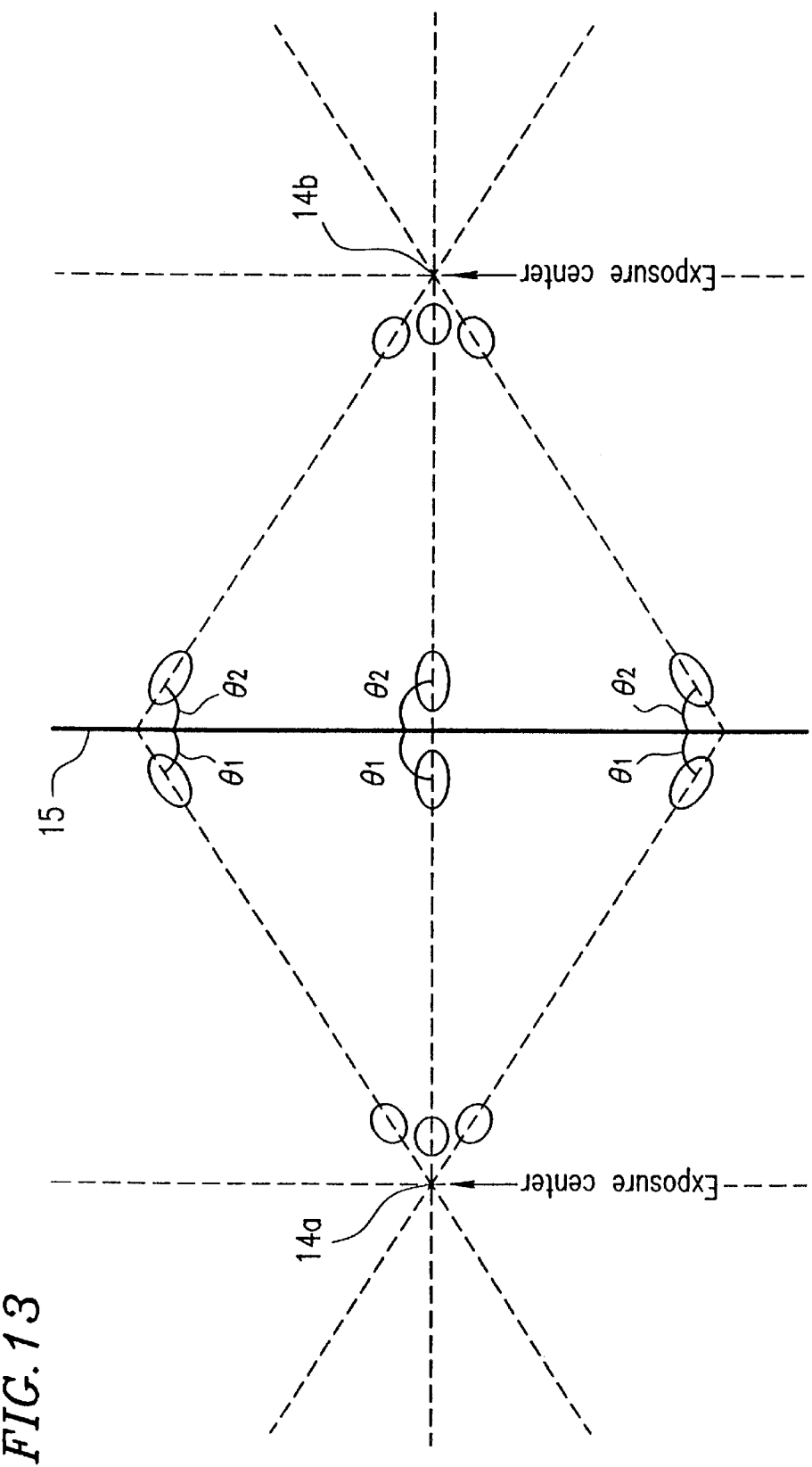
FIG. 13 is a schematic diagram illustrating a position dependency of the shape of the convex/concave portion in the reflector of the present invention.

FIG. 13 schematically illustrates a position dependency of the shape of the obtained convex/concave portion. The ellipticity $\alpha$ (rate of change) decreases toward the exposure center and increases away from the exposure center in a peripheral region. It can be seen that the positional relationship between two ellipses on the opposite sides of the junction 15 (the angle between the long axes thereof) varies depending upon the position. In the present example, the ellipticity $\alpha$ was about 1.05 or less across the entire area, and the junction 15 was therefore not observed. Thus, a uniform reflection characteristic was achieved across the entire panel.

Figure 14:
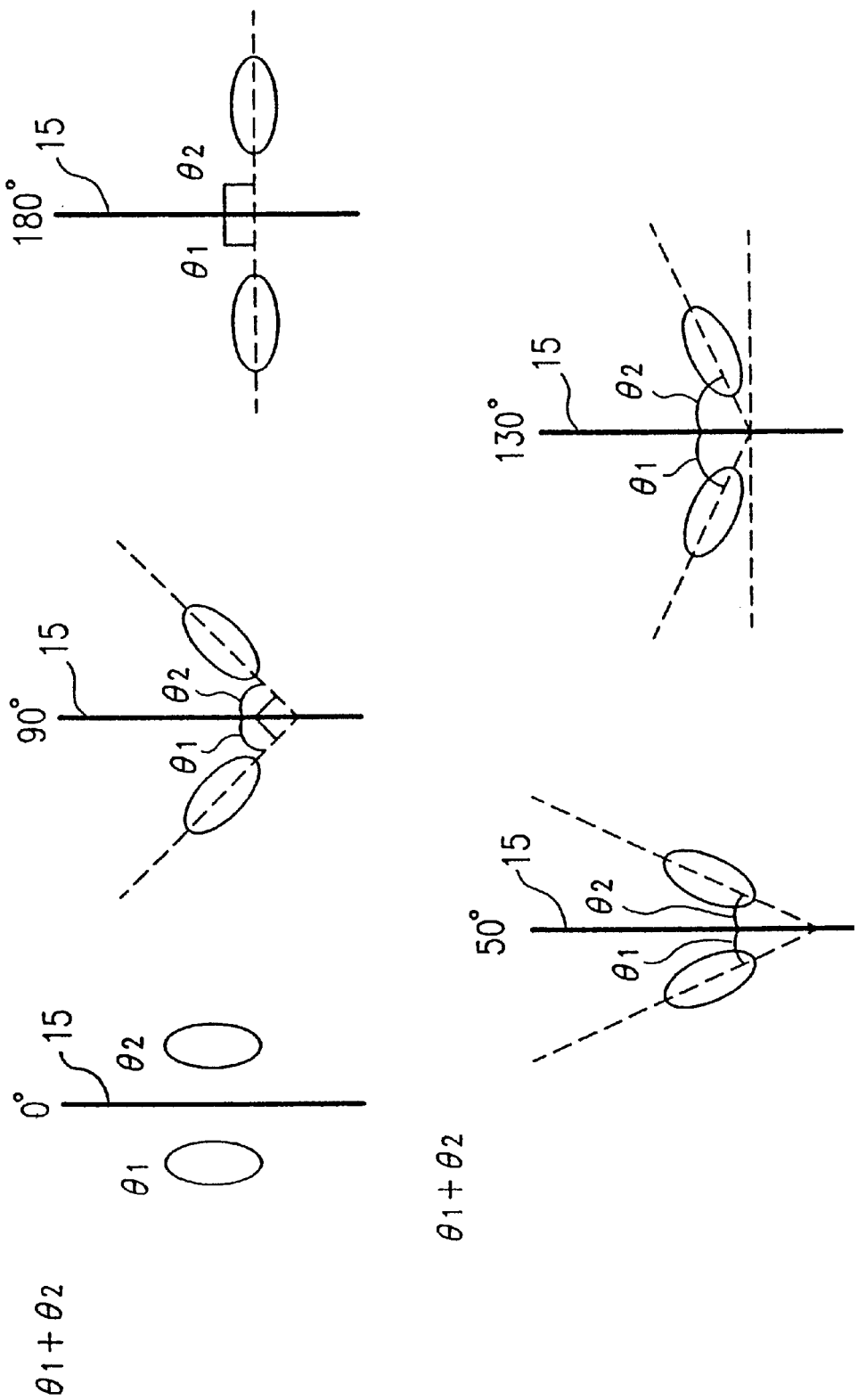
FIG. 14 is a schematic diagram illustrating a position relationship between two convex/concave portions in the vicinity of the junction of the reflector of the present invention.

Moreover, the relationship among the angle $\theta$ between the long axes, the ellipticity $\alpha$ and the phenomenon that the junction is observed was quantitatively examined. Referring to FIG. 14, where $\theta 1$ denotes an angle between the junction 15 and the long axis of an ellipse on one side of the junction 15, $\theta 2$ denotes an angle between the junction 15 and the long axis of an ellipse on the other side of the junction 15, and $\theta$ denotes $\theta 1+\theta 2$, $\theta$ takes various values depending upon the position of the junction 15. When $\theta$ is 0° or 180° (when the two ellipses are parallel to each other), the anisotropy does not change at the junction 15 even if the ellipticity $\alpha$ is large, and thus the junction is not observed. However, when $\theta$ is 50°, 90° or 130°, the anisotropy discontinuously changes at the junction 15, whereby the junction 15 is likely to be observed even if the ellipticity $\alpha$ is relatively small.

Figure 15:
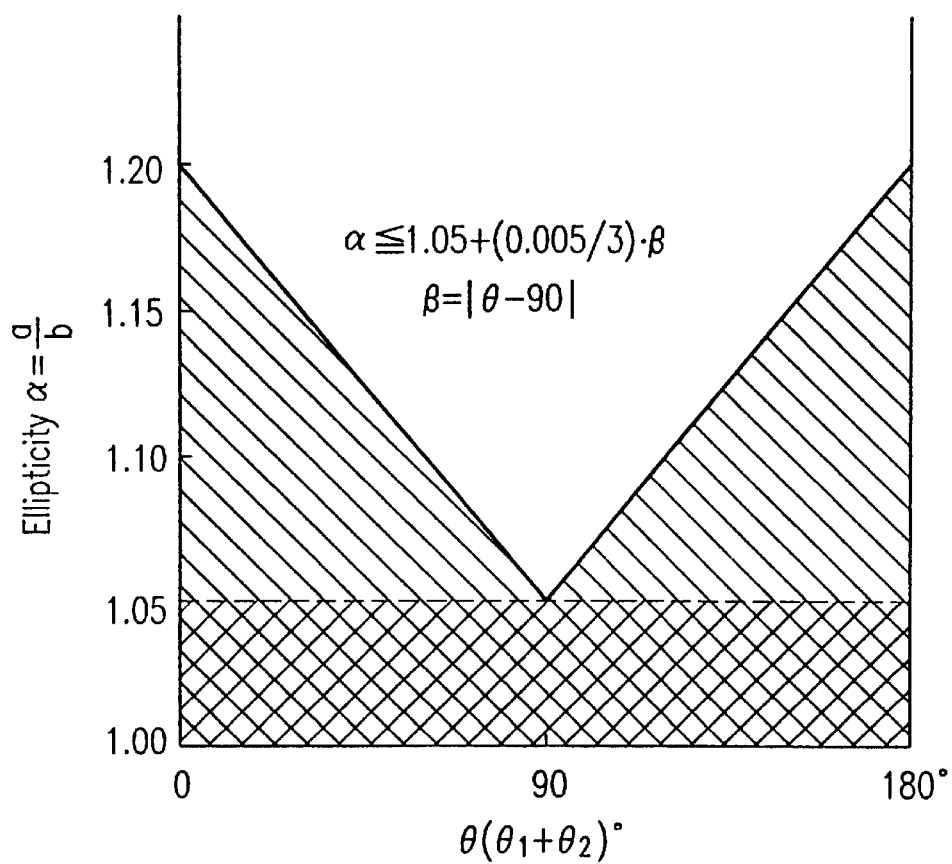
FIG. 15 is a graph illustrating the relationship among the ellipticity of the convex/concave portion, the position relationship between two convex/concave portions and the phenomenon that the junction is observed.

FIG. 15 illustrates a graph illustrating the above-described relationship. It is shown that, as the ellipticity $\alpha$ increases, the range of $\theta$ in which junction 15 is not observed is more limited in the vicinity of 0° and 180° (where the long axes of the ellipses are parallel to each other). It is also shown that the condition under which the junction 15 is not observed can be expressed as $\alpha=$ about 1.05+ (0.005/3)$\cdot\beta$ or less (where $\beta=|\theta-90|$) (the entire hatched region in FIG. 15). When the ellipticity $\alpha$ exceeds about 1.20, display non-uniformity occurs regardless of the value of $\theta$. Therefore, the ellipticity $\alpha$ is preferably about 1.20 or less.

It is also shown that when the ellipticity $\alpha$ is about 1.05 or less (the cross-hatched region in FIG. 15), the junction 15 is not observed regardless of the value of $\theta$. In order to suppress the ellipticity $\alpha$ to about 1.05 or less, an exposure machine having a lens distortion of about ±0.25 $\mu$m may be used.

In the present example, the second exposed region is located on the left or right of the first exposed region. For a larger substrate, third and subsequent exposed regions can be additionally provided on the upper or lower side of the first and second exposed regions.

As described above, the present invention provides a reflector produced through a plurality of exposure steps in which an exposure junction is not observed and which provides a uniform reflection characteristic across the entire reflector, and a method for producing the same. Moreover, the present invention provides a large reflection type liquid crystal display having a diagonal line of about 6 inches or greater and which has a high display quality.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A reflector, comprising a plurality of convex/concave portions on a surface of a substrate, wherein:

each of the convex/concave portions has a circular or elliptical shape as viewed in a direction perpendicular to the surface of the substrate;

the surface of the substrate includes first and second regions adjacent to each other defining a boundary therebetween;

in each of the first and second regions, an ellipticity $\alpha$ of the shape of the convex/concave portions continuously changes away from a respective predetermined central position; and wherein the ellipticity $\alpha$ is about $1.05+(0.005/3)\cdot\beta$ or less, where $\beta=|\theta-90|$, and $\theta$ denotes an angle between long axes of the elliptical shapes of the convex/concave portions on opposite sides of the boundary.

2. A reflector according to claim 1, wherein the ellipticity is about 1.05 or less.

3. A reflector according to claim 1, wherein at least one of respective predetermined central positions of the first and second regions is offset from centers of gravity of the first and second regions, respectively.

4. A reflection type liquid crystal display, comprising a reflector according to claim 1.

* * * * *